(12) United States Patent
Pelaingre et al.

(10) Patent No.: US 12,233,594 B2
(45) Date of Patent: Feb. 25, 2025

(54) METHOD AND MACHINE FOR AUTOMATING THE LAYER-BY-LAYER MANUFACTURING OF AN OBJECT USING A SOLID-SOLID ADDITIVE MANUFACTURING METHOD

(71) Applicants: CIRTES SRC, Saint-die-des-Vosges (FR); Claude Barlier, Coinches (FR)

(72) Inventors: Cyril Pelaingre, Mandray (FR); David Di Giuseppe, Betrichamps (FR); Denis Cunin, Les Poulieres (FR); Hugo Ricatte, Taintrux (FR); Benoit Delebecque, Nayemont les Fosses (FR); Thomas Guillaume, Saint-Michel-sur-Meurthe (FR); Claude Barlier, Coinches (FR)

(73) Assignees: CIRTES SRC, Saint-die-des-Vosges (FR); Claude Barlier, Coinches (FR)

( * ) Notice: Subject to any disclaimer, the term of this patent is extended or adjusted under 35 U.S.C. 154(b) by 404 days.

(21) Appl. No.: 17/621,997

(22) PCT Filed: Jun. 26, 2020

(86) PCT No.: PCT/EP2020/068126
§ 371 (c)(1),
(2) Date: Dec. 22, 2021

(87) PCT Pub. No.: WO2020/260652
PCT Pub. Date: Dec. 30, 2020

(65) Prior Publication Data
US 2022/0362988 A1  Nov. 17, 2022

(30) Foreign Application Priority Data

Jun. 27, 2019 (FR) ........................ 1907059

(51) Int. Cl.
*B33Y 30/00* (2015.01)
*B29C 64/147* (2017.01)
(Continued)

(52) U.S. Cl.
CPC .......... *B29C 64/147* (2017.08); *B29C 64/232* (2017.08); *B29C 64/35* (2017.08);
(Continued)

(58) Field of Classification Search
CPC ... B29C 64/205; B29C 64/141; B29C 64/147; B29C 64/307; B32B 2038/1891; B33Y 30/00
See application file for complete search history.

(56) References Cited

U.S. PATENT DOCUMENTS 5,847,958 A    12/1998  Shaikh
5,883,357 A *  3/1999  Newman ................. B32B 38/18
                                                        414/744.5
(Continued)

FOREIGN PATENT DOCUMENTS

EP    0369909 A1    5/1990
FR    2789188 A1    6/2005
GB    2011814 A     7/1979

OTHER PUBLICATIONS

English machine translation of EP0369909 (Year: 1990).*

*Primary Examiner* — Scott W Dodds
(74) *Attorney, Agent, or Firm* — Craft Chu PLLC; Andrew W. Chu

(57) ABSTRACT

A method and machine for automating the layer-by-layer manufacturing of an object according to a solid-solid additive manufacturing method, includes a vacuum table and at least one machining tool movably mounted above the table. The machine also includes a turning station having a cross member which is movable in a longitudinal direction above
(Continued)

the table and in a vertical direction. There is a device gripping a plate mounted such that it can rotate about an axis parallel to the cross member. The machine also includes a device supporting a plate to allow the plate to be gripped on either of the two sides thereof by the device gripping the plate. There is an X and Y wedge device suitable for determining the position for, and positioning a plate, a set or a sheet.

10 Claims, 11 Drawing Sheets

(51) Int. Cl.
| | | |
|---|---|---|
| *B29C 64/232* | (2017.01) | |
| *B29C 64/35* | (2017.01) | |
| *B29C 64/386* | (2017.01) | |
| *B33Y 10/00* | (2015.01) | |
| *B33Y 40/20* | (2020.01) | |
| *B33Y 50/00* | (2015.01) | |
| *G05B 19/4099* | (2006.01) | |

(52) U.S. Cl.
CPC ............ *B29C 64/386* (2017.08); *B33Y 10/00* (2014.12); *B33Y 30/00* (2014.12); *B33Y 40/20* (2020.01); *B33Y 50/00* (2014.12); *G05B 19/4099* (2013.01); *G05B 2219/31368* (2013.01); *G05B 2219/49023* (2013.01)

(56) References Cited

U.S. PATENT DOCUMENTS 6,745,446 B1 * 6/2004 Barlier ............... G05B 19/4099
29/418
2018/0065181 A1 * 3/2018 Mori .................... B23K 26/144

* cited by examiner

METHOD AND MACHINE FOR AUTOMATING THE LAYER-BY-LAYER MANUFACTURING OF AN OBJECT USING A SOLID-SOLID ADDITIVE MANUFACTURING METHOD

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The subject matter of the present invention is a method and a machine for automating the layer-by-layer manufacturing of an object according to a solid-solid additive manufacturing method, such as the one known as Strato-conception (REGISTERED TM).

2. Description of Related Art Including Information Disclosed Under 37 CFR 1.97 and 37 CFR 1.98

The so-called additive manufacturing process Stratoconception (REGISTERED TM) developed by the present Applicant, consists, in its simplest version, in digitizing the object to be manufactured, in digitally breaking it down into different complementary elementary layers, in putting in sets, then in reproducing these different layers by cutting and/or machining operations in order to obtain sheets, and finally in superimposing and/or juxtaposing, positioning, assembling and making integral said different sheets in order to reproduce the object to be manufactured.

Accessorily, depending on the complexity of the part to be manufactured, it may be considered, during the manufacture of the sheets, to add assembling elements to the shape to be produced, such as extensions or trigger guards, in order to permit indexing one part relative to another one during the assembling, and intended to be removed later on. It should be noted that, also for the purpose of indexing, it may be considered using inserts, which serve both as positioning pins and as links between the sheets.

In general, the different sheets have the same thickness and are cut out of one or several plates of a material, the positioning and the orientation of the different sheets on a plate is chosen for the purpose of optimization, and results in the development of a set of sheets.

An additional difficulty should be noted in that the plates may originally have variations in thickness with the consequence of not respecting the dimensions. It is of course possible to use calibrated plates, or to recalibrate the plates before use, which results in increased costs.

On the other hand, it is also necessary to take into consideration the joint created between each sheet during the gluing operation, the thickness of which, although calibrated during the deposition, can also have an influence on the final dimensions of the object to be reproduced.

The complexity of some objects to be manufactured, and hence of the different sheets, can lead to not only cutting the plate, but also to carry out 3D milling operations in order to create the drafted and undercut parts, in association with the turning upside down of the set of sheets if necessary.

Such a manufacturing process does not pose any production problem when it is implemented in an artisanal way, as is the case in FR 2 789 188, however, this is not the case when it must be industrialized and automated. This document presents the layer-by-layer solid/solid additive manufacturing method, such as the one known as Stratoconception (REGISTERED TM), without addressing the automation of the manufacturing, but in an artisanal, even manual, version.

It is perfectly known that the transition from an artisanal manufacturing to an automation does not consist of a simple transposition of the manual actions.

BRIEF SUMMARY OF THE INVENTION

The subject matter of the present invention is therefore to provide a method permitting this automation of the layer-by-layer manufacturing of an object according to a solid/solid additive manufacturing, and with the aim of eliminating any manual intervention.

The method for automating the layer-by-layer manufacturing of an object using a solid/solid additive manufacturing method is characterized in that it comprises the following steps:

- digital breaking down of said object along one or several axes, and a thickness, into different sheets, by digital slicing,
- optimized distribution in a set of said sheets on a plate of raw material,
- calculation of the trajectories of the cutting and/or machining tool or tools,
- digital slicing of the sheets, then micro-milling of the front side of the sheets of the set in finishing,
- turning upside down of the set,
- wedging, marking and positioning of the set,
- micro-milling in a set of the back side of the sheets, in roughing,
- extraction of a first sheet of the set, then displacement in a so-called horizontal XY-plane, and angular positioning of said sheet on a mounting and finishing area,
- deposition of glue on said first sheet,
- extraction of a second sheet of the set, then displacement along said XY-plane, and angular positioning of said sheet, and deposition and maintaining on said first sheet, then reproduction of the steps of gluing and extraction for each of the sheets remaining to be assembled.

According to an additional feature of the method according to the invention, a step of determining the nature, the shape and the positioning of assembling elements internal or external to the object is interposed between the step of digital breaking down of the object and that of optimized distribution in a set.

According to an additional feature of the method according to the invention, each of the operations of depositing one sheet on another one after gluing is followed by a step of micro-milling on the back side.

The purpose of the micro-milling operation is, in addition to the finishing, to remove the excess of joint material resulting from the gluing, and above all to rectify the defects related namely to the stacking. This operation is performed after stacking each sheet, so as to readjust the dimensional parameters at each level, knowing for example that a single 3D machining of the object at the end of the stacking operation would probably be inoperative or even impossible to be implemented.

There are already automatons permitting to carry out some operations for implementing a layer-by-layer solid/solid additive manufacturing method.

Such a machine comprises a table, preferably of the vacuum type, and machining tools mounted movably in displacement above said table, for example through a cross member movable longitudinally above said table and equipped with mobile machining tools along said cross member, the movements being managed by a central computer unit.

Such a machine is however limited in its use, it does not permit to implement the entire process according to the invention.

Therefore, the subject matter of the present application is also a machine permitting to overcome this deficiency, and to implement the method according to the invention.

The machine permitting the automation of the layer-by-layer manufacturing of an object according to a solid/solid additive manufacturing method according to the invention comprises a machining table held by vacuum and at least one machining tool mounted movably in displacement above said table, and it is characterized in that it comprises in addition, a turning station comprising, on the one hand, a cross member longitudinally movable above said table and vertically movable, carrying a means for gripping a plate mounted movably in rotation about an axis parallel to said cross member, on the other hand a means for supporting a plate, designed capable of permitting the gripping of the latter by either one of its two faces, by means of said gripping means, and yet on the other hand wedging means in X- and Y-direction capable of permitting the marking and positioning of a plate, of a set or of a sheet.

It should be noted that though the turning station is above all suitable for turning upside down a set, it is perfectly possible to configure it for turning upside down a sheet, as needed, just as it also permits to turn upside down a simple plate.

According to an additional feature of the machine according to the invention, the cross member, which the gripping means of the turning station carries, is movably mounted on two benches, while a tool holder is movably mounted along a movable cross member on the same two benches.

According to another additional feature of the machine according to the invention, on the tool holder can be adapted means for gripping a cut part, as well as gluing means or the like.

According to a variant of the machine according to the invention, the machining means can also be adapted to the tool holder.

Indeed, the existing machines each include, as has been mentioned, a table and machining tools mounted movably in displacement above said table. It is possible to adapt these existing tables, in order to make them conformant to the present invention. Thus, to these existing tables, which are capable of cutting and machining a plate in order to obtain a set, are added, on the one hand, the turning means as well as the tool holder and the tools for gripping and gluing the parts resulting from the set.

On a machine, which does not constitute an adaptation to an existing machine, the tool holder is configured to also carry cutting and machining tools.

According to another additional feature of the machine according to the invention, it includes in addition means for cleaning the table, associated with the tool holder.

According to another additional feature of the machine according to the invention, it includes an assembling area comprising a mounting table associated with an elevator capable of maintaining the object to be manufactured at a height depending on the height of the machining table.

According to another additional feature of the machine according to the invention, the assembling area includes means for clamping, against the mounting table, the object during the assembling and after gluing, and which cooperate with the elevator of said table in order to perform the pressing of said object.

According to another additional feature of the machine according to the invention, the means for supporting a plate is retractably mounted in the machining table.

BRIEF DESCRIPTION OF THE SEVERAL VIEWS OF THE DRAWINGS

The advantages and features of the method and of the machine according to the invention will become more evident from the following description, which relates to the attached drawing, which represents several non-restrictive embodiments thereof.

In the attached drawing.

DETAILED DESCRIPTION OF THE INVENTION

Figure 1:
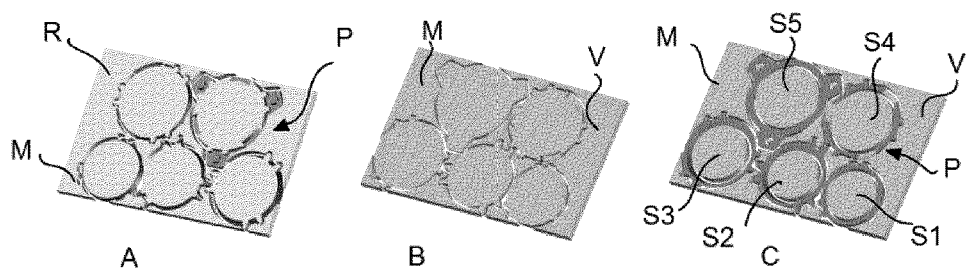
FIGS. 1, 2, 3, 4, 5 and 6 show schematic perspective views of different steps of the construction of an object, using the method according to the invention.

Referring to FIG. 1, one can see three steps of preparation of a plate of material M for the layer-by-layer manufacturing of an object using a solid/solid additive manufacturing method, such as the one known as Stratoconception (REGISTERED TM).

According to the method of the invention, the object to be reproduced will previously have been broken down digitally along one or several axes, in this case only one axis, and a thickness, into different sheets, which are arranged in a set P on the plate M, while the trajectories of the cutting and machining tool or tools have been defined.

In FIG. 1, step A corresponds to the slicing and micro-milling of the front side R of the plate M in 3D finishing, step B corresponds to the turning upside down of the plate M so as to expose the back side V to the tools, and step C corresponds to the micro-milling into a set of the back side of the sheets in 2D roughing, in this case into five sheets S1, S2, S3, S4 and S5.

Figure 2:
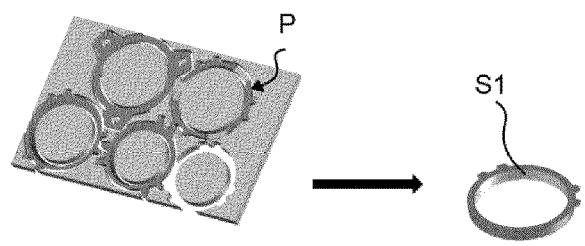

In FIG. 2, the sheet S1 is extracted from the set P, in order to be positioned, and to be submitted, on the one hand, to a 3D finishing micro-milling, and a gluing of its upper edge.

Figure 3:
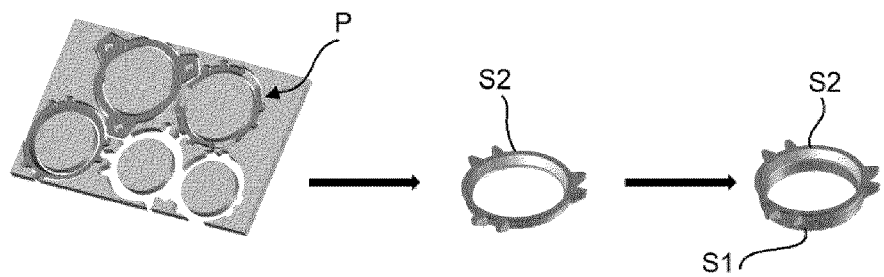

In FIG. 3, the sheet S2 is extracted from the set P, in order to be deposited, positioned and assembled with the sheet S1, the whole then being exposed to a 3D finishing micro-milling, and to a gluing of the upper edge of the sheet S2.

Figure 4:
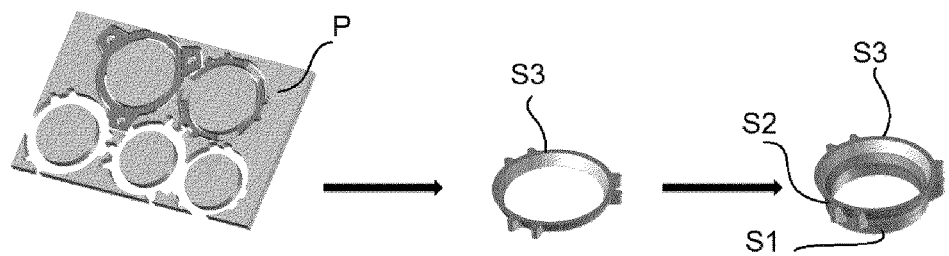

In FIG. 4, the sheet S3 is extracted from the set P, in order to be deposited, positioned and assembled with the sheet S2, the whole then being exposed to a micro-milling, the removal of the excess of joint in 3D finishing, and to a gluing of the upper edge of the sheet S3.

Figure 5:
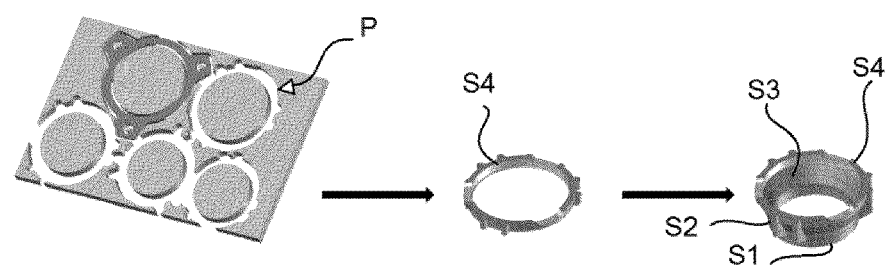

In FIG. 5, the sheet S4 is extracted from the set P, in order to be deposited, positioned and assembled with the sheet S3, the whole then being exposed to a micro-milling, the removal of the excess material of the joint in 3D finishing, and to a gluing of the upper edge of the sheet S4.

Figure 6:
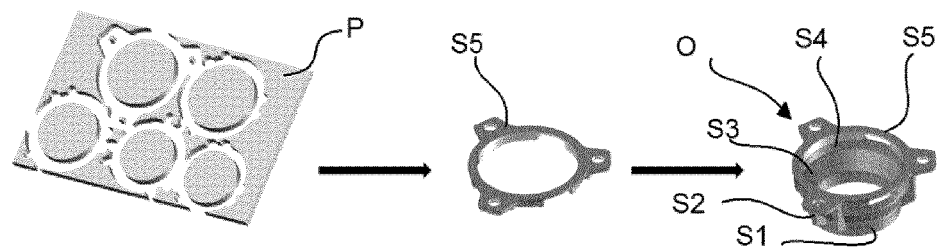

Finally, in FIG. 6, the sheet S5 is extracted from the set P, in order to be deposited and assembled with the sheet S4, the whole then being exposed to a 3D finishing micro-milling, in order to obtain the object O.

It should be noted that, at each step, the micro-milling also permits to correct the defects along the so-called vertical Z-axis orthogonal to the XY-plane, related to the potential variations in thickness of the plates and the joint.

Figure 7:
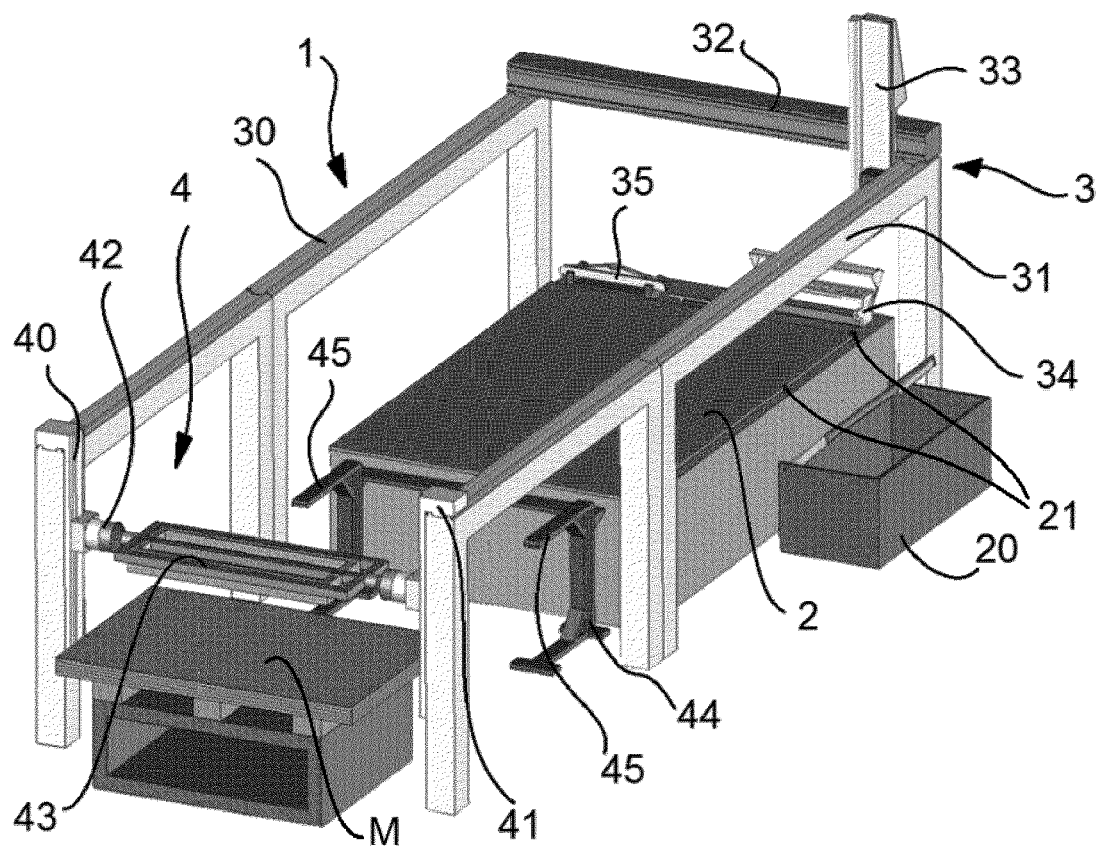
FIG. 7 shows a schematic perspective view of a machine according to the invention.

When referring now to FIG. 7, we can see a machine 1 according to the invention, which permits to automatically implement the above-described method.

This machine 1 comprises a table 2, preferably a vacuum table, as well as a Cartesian gantry 3 comprising two benches 30 and 31 laterally and longitudinally bordering the table 2, on which can move, in the longitudinal direction, a movable cross member on which is mounted, movably along the latter, a tool holder 33, while at one end of the table 2 are stored tools 34 intended to be adapted to the tool holder 33.

It should be noted that the representation of the machine is not restrictive, it can for example be designed so that the longitudinal movements are carried out at the level of the base.

The machine 1 also includes a loading/turning station 4 cooperating with the two benches 30 and 31, and which comprises two carriages 40 and 41, movable in displacement on the benches 30 and 31, respectively, a cross member 42, movable vertically on the carriages 40 and 41, as well as in axial rotation, and carrying gripping means 43. The turning station 4 also comprises a console 44, arranged at the end of the table 2 opposite the one where tools 34 are stored, and which essentially comprises two brackets 45 spaced apart from each other in order to create a central space, permitting the passing through of the gripping means 43.

Figure 22:
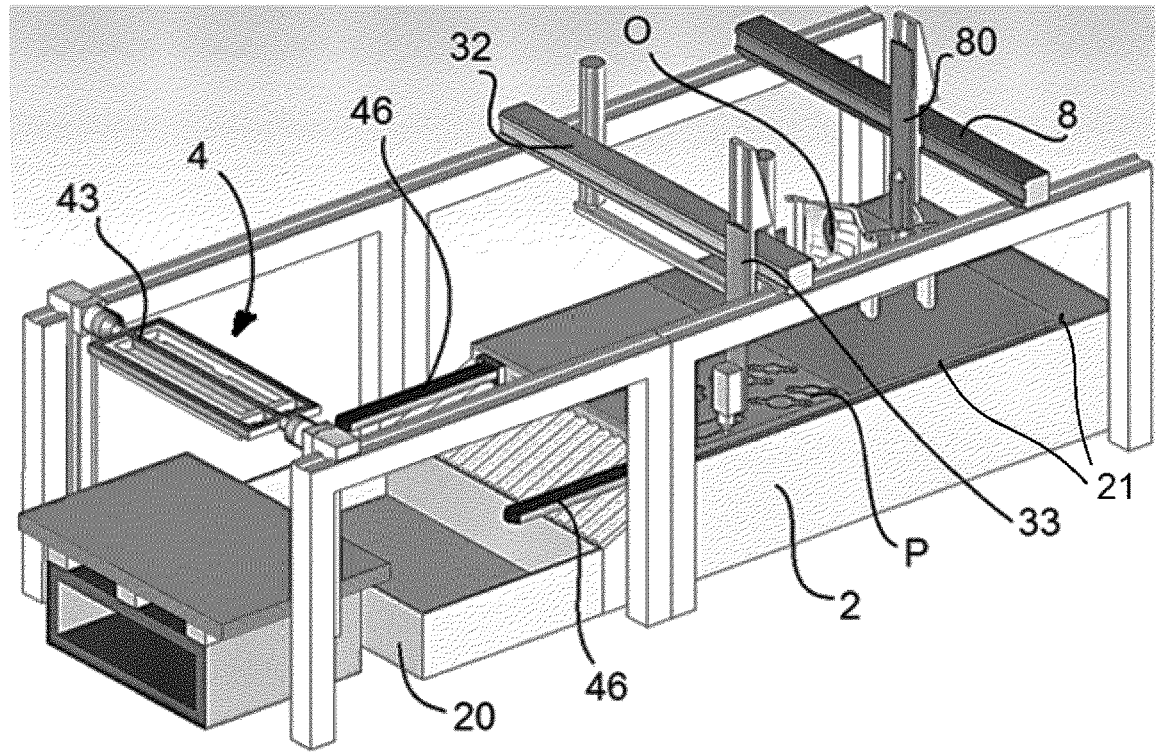
FIG. 22 shows a schematic perspective view of another variant of the machine according to the invention.

In an alternative construction, the two brackets 45 can be replaced by the teeth 46 of a retractable fork in the table 2, as shown in FIG. 22.

When referring now to FIGS. 8 to 19, a description will be given of the steps of the manufacturing method, implemented with the machine 1.

Figure 8:
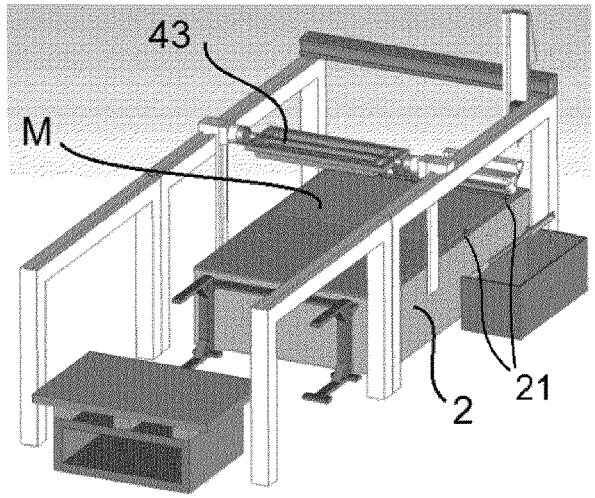
FIGS. 8, 9, 10, 11, 12, 13, 14, 15, 16, 17, 18, 19 and 20 show schematic perspective views of the same machine, during different successive steps of implementation of the method according to the invention.

In FIG. 8, the gripping means 43 have taken a plate of material M from a storage location in order to deposit it on the table 2, the positioning in a so-called horizontal XY-plane being carried out by wedging in abutment, in this case against studs 21.

Figure 9:
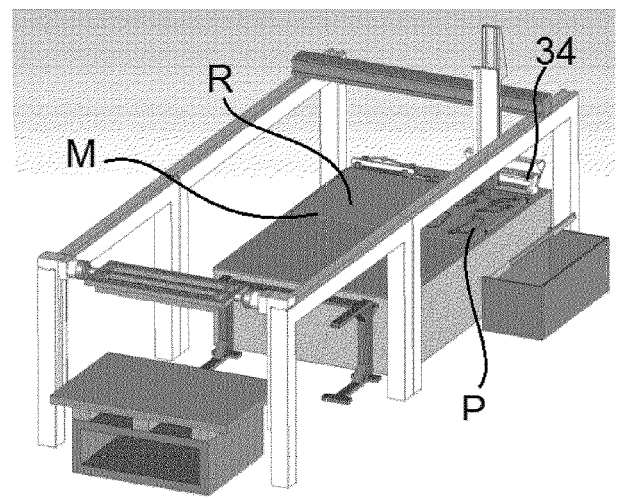

In FIG. 9, the front side R of the plate M is sliced and machined in 3D finishing by means of tools 34, in order to create the set P.

Figure 10:
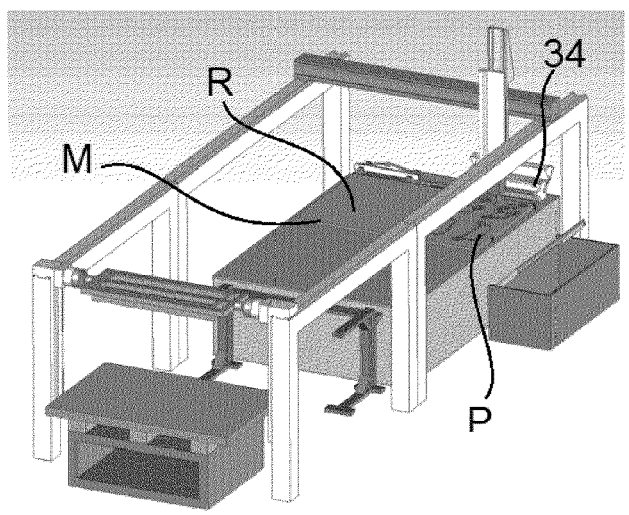
Figure 11:
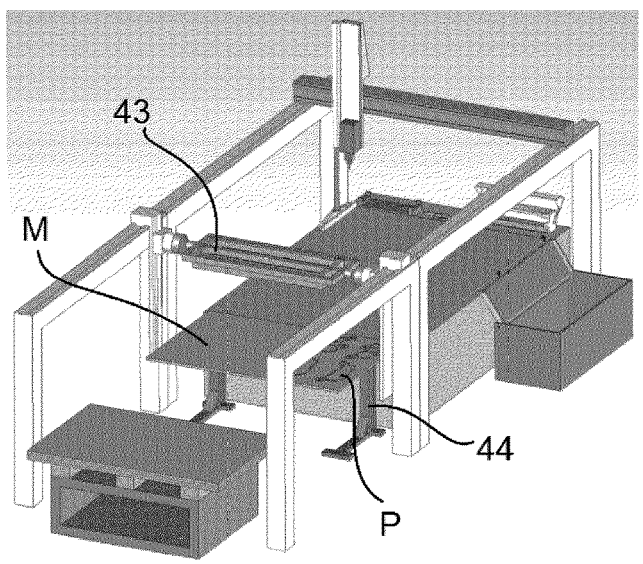
Figure 12:
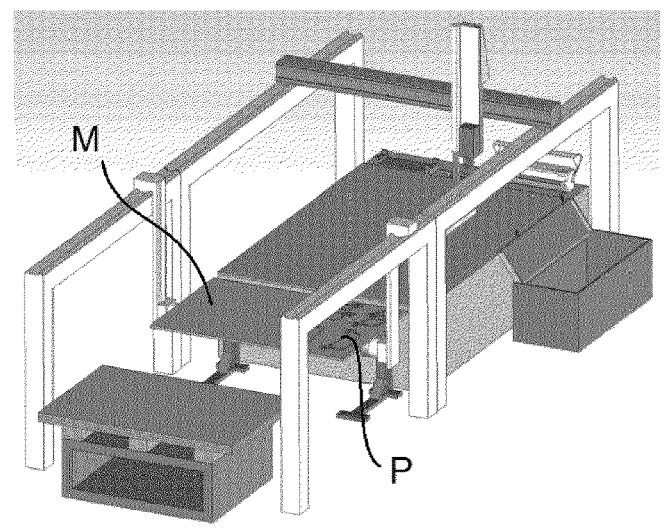

FIGS. 10 to 14 relate to the turning upside down of the set P. In FIG. 10, the plate M is gripped by the gripping means 43, then, in FIG. 11, deposited on the console 44 resting by its back side V, then, in FIG. 12, the gripping means 43 are positioned under the plate M, between the brackets 45, in order to grip it by its back side V, finally in FIG. 13, the plate M is turned upside down in order to be placed on the table 2 on its front side R, FIG. 14.

Figure 13:
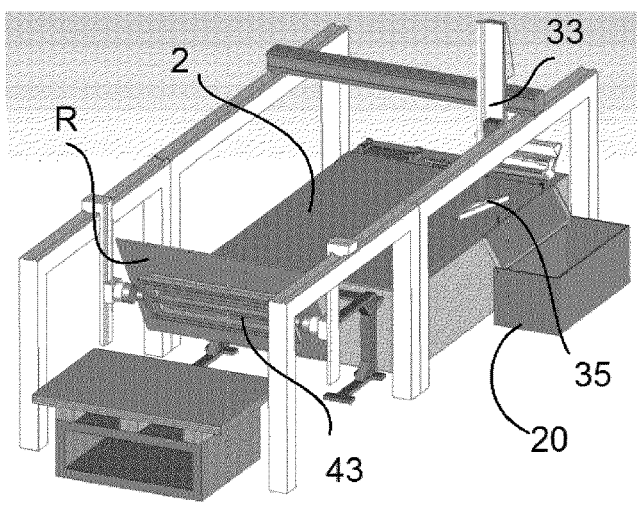
Figure 14:
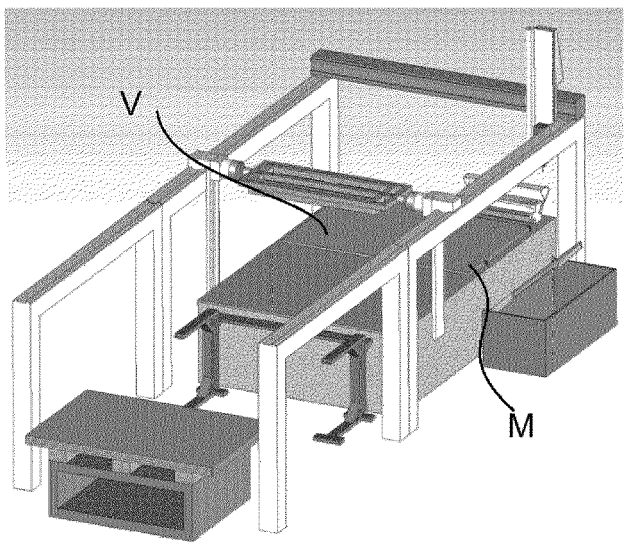

It should be noted that in FIG. 13, we can see that during the phase of turning the plate M upside down, a cleaning of the table 2 is carried out in a masked period, the tool holder 33 having gripped a cleaning means 35 such as a scraper and vacuum cleaner, which is moved on the surface, in order to push and suck the machining residues out of the table 2, in this case in order to drop them into a receptacle 20.

Figure 15:
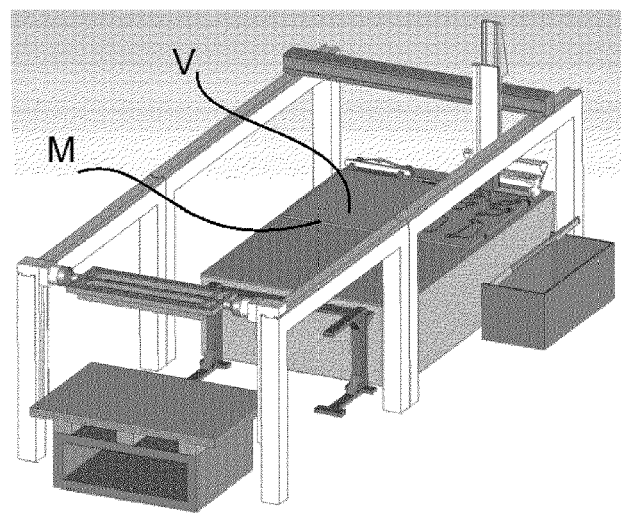
Figure 16:
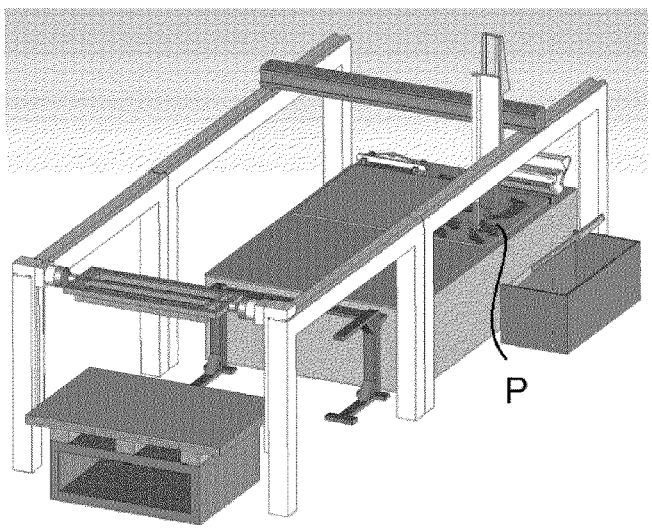
Figure 17:
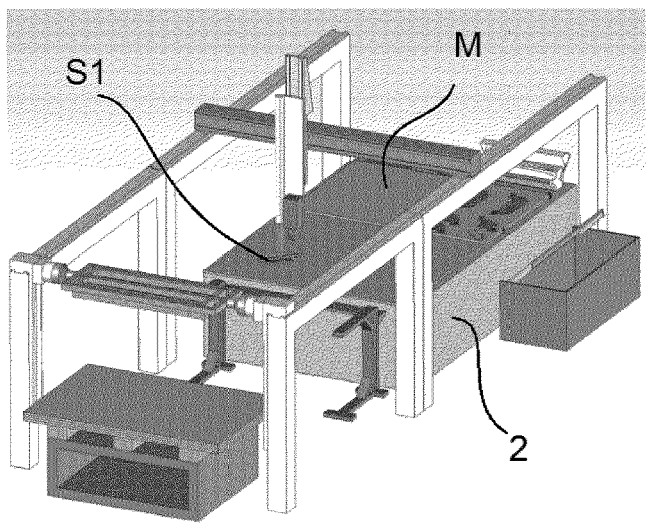

In FIG. 15, the back side V of the plate M is machined in 2D roughing, while in FIG. 16 a layer S1 is taken from the set P and, in FIG. 17, is deposited on the table 2 next to the plate M in a mounting/stacking area.

Figure 18:
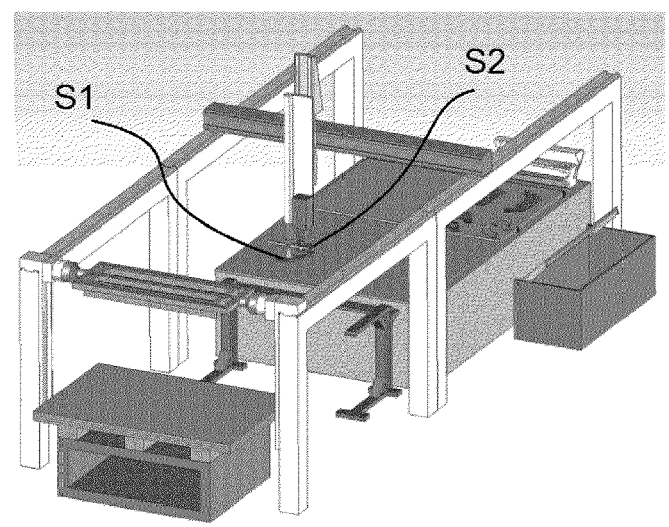
Figure 19:
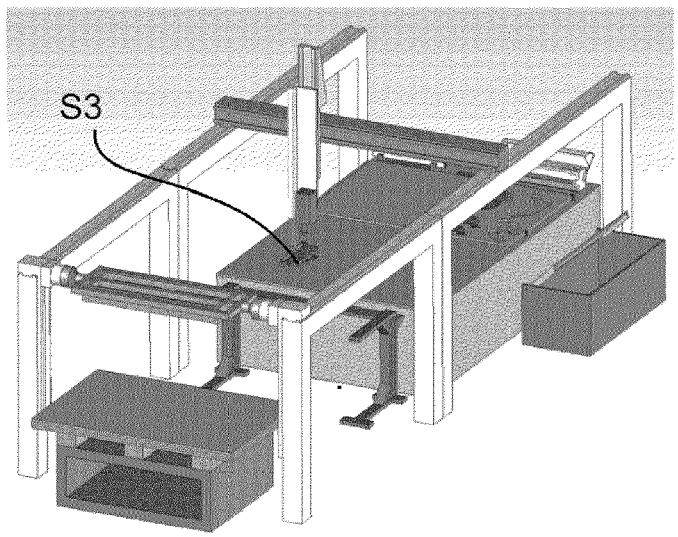

It should be noted that the mounting/stacking area and the machining area represented in the figures can be interchangeable, as represented for example in FIG. 22. In FIG. 18, a sheet S2 is taken from the set and deposited next to the sheet S1, while, in FIG. 19, a sheet S3 is taken from the set and deposited on the sheets S1 and S2 after machining, then gluing them.

Figure 20:
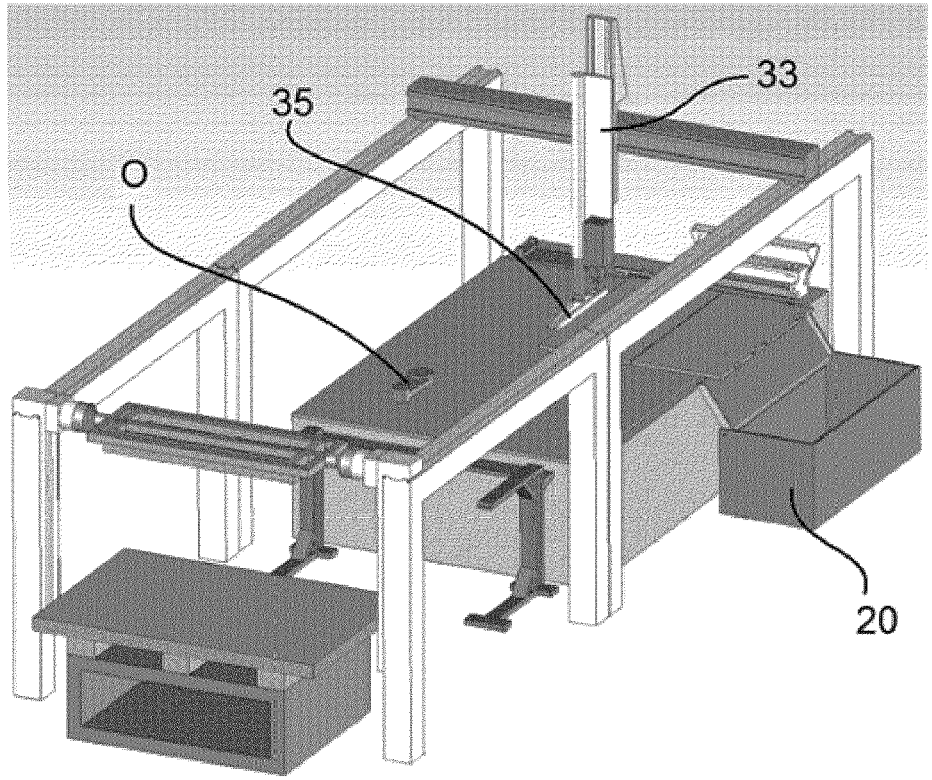

In FIG. 20, we can see the finished object O, while the tool holder 33 and the cleaning means 35 evacuate the residues.

Figure 21:
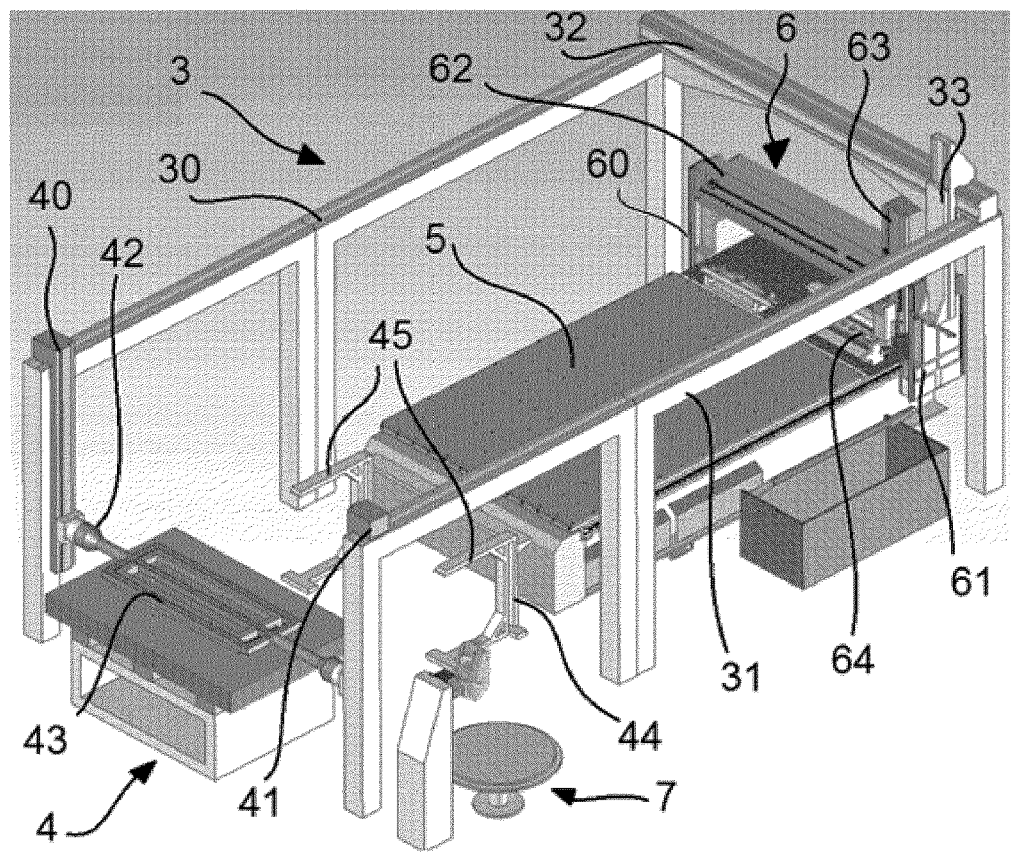
FIG. 21 shows a schematic perspective view of a variant of the machine according to the invention.

When referring now to FIG. 21, we can see a variant of the machine according to the invention, and more particularly an adaptation to an existing machine.

This existing machine includes a table 5, which a movable gantry 6 is associated with, comprising two lateral posts 60 and 61, movable along the table 5, and a cross member 62, which connects them, which is thus movable above the table 5 and along which a tool holder 63 capable of gripping the machining tools 64 stored at the end of the table 5 can move.

According to the invention, the existing table 5 is complemented, in order to enable it to reproduce the method according to the invention, by the addition, on the one hand, of a gantry 3 comprising two benches 30 and 31, a movable cross member 32, intended to move a tool holder 33, which is however reserved for the operations of gripping, gluing and pressing the sheets, as well as for cleaning the table 5; and on the other hand, a turning station 4 comprising two carriages 40 and 41, a cross member 42, gripping means 43, and a console 44.

In the embodiment shown, the machine is associated externally with a machining station 7 permitting to carry out the finishing operations, and namely, but not exclusively, the removal of the extensions or trigger guards, which were used for indexing.

It should be noted that the station 7 can be advantageously be replaced by the association of a machining tool with the tool holder 33 through a tool holder with two axes of rotation, or a bi-rotating head, for machining on five axes. This configuration namely permits to integrate all the functions into the same machine.

When referring now to FIG. 22, we can see another variant, namely of the machine shown in FIG. 7.

On this machine is added an additional movable cross member 8, which a tool holder 80 dedicated to the gluing and handling of the sheets for assembling is associated with, so as to be able to dissociate the machining/cleaning and gluing/stacking functions. This dissociation permits a more efficient processing in a masked period.

Figure 23:
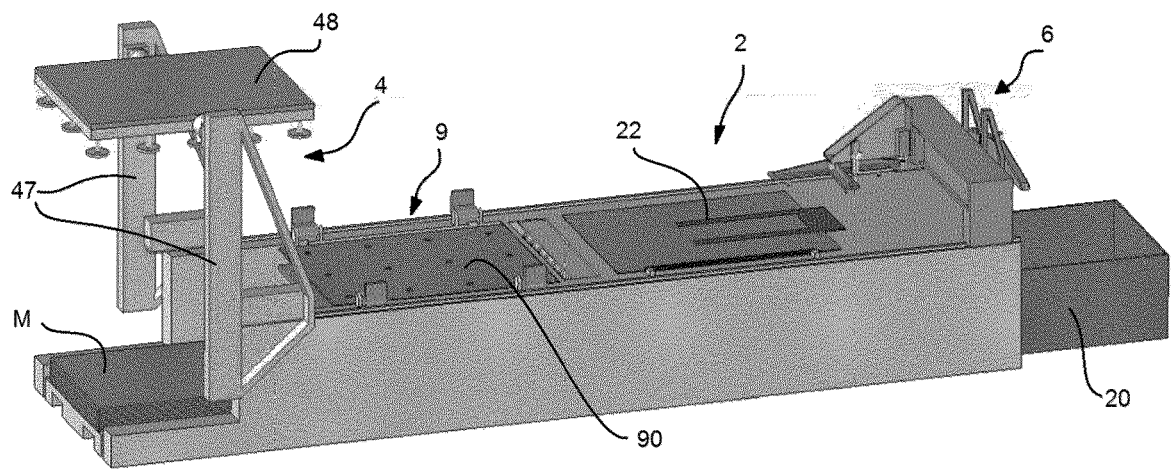
FIG. 23 shows a schematic perspective view of another variant of the same machine according to the invention.

When referring now to FIG. 23, as well as to FIGS. 24, 25, 26, 27 28 and 29, we can see a variant of the machine permitting to automatically implement the method according to the invention, in which the different stations dedicated to one or several operations are of a design different from the one described above.

Thus, in FIG. 23, which represents the machine as a whole, we can see that it comprises a table 2, a mobile gantry 6 equipped with a tool holder 63, a loading/turning station 4 for plates M, consisting of a mobile gantry comprising two mobile columns 47 between which a gripping plate 48 can move, and finally an assembling area 9 dedicated to mounting the object to be produced.

Figure 24:
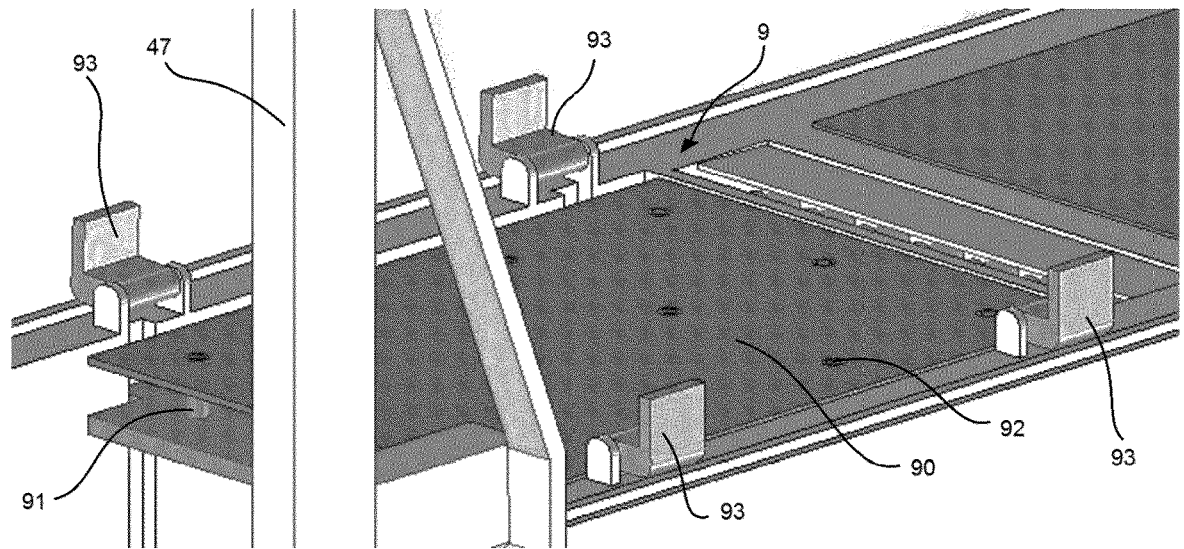
FIGS. 24, 25, 26, 27 28 and 29 each represent a schematic and perspective view of part of this same variant of the machine, in a particular configuration of use.
Figure 25:
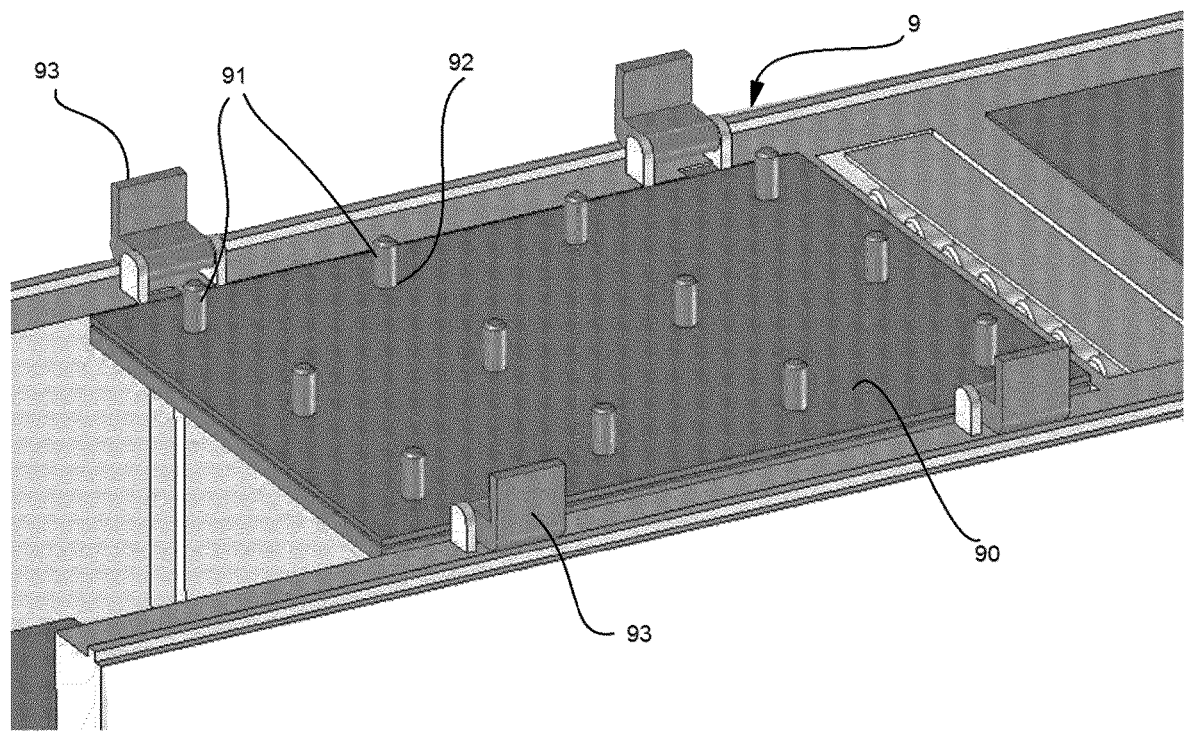

As can be seen in more detail in FIGS. 24 and 25, the assembling area 9 includes a mounting table 90, which is associated with an elevator so that the object being mounted can descend progressively, so that the last assembled sheet can always be at the same level as the machining table 2.

In addition, the mounting table 90 cooperates with lifting studs 91, which can pass through it through holes 92, in order to permit the extraction of the object after assembling.

Figure 26:
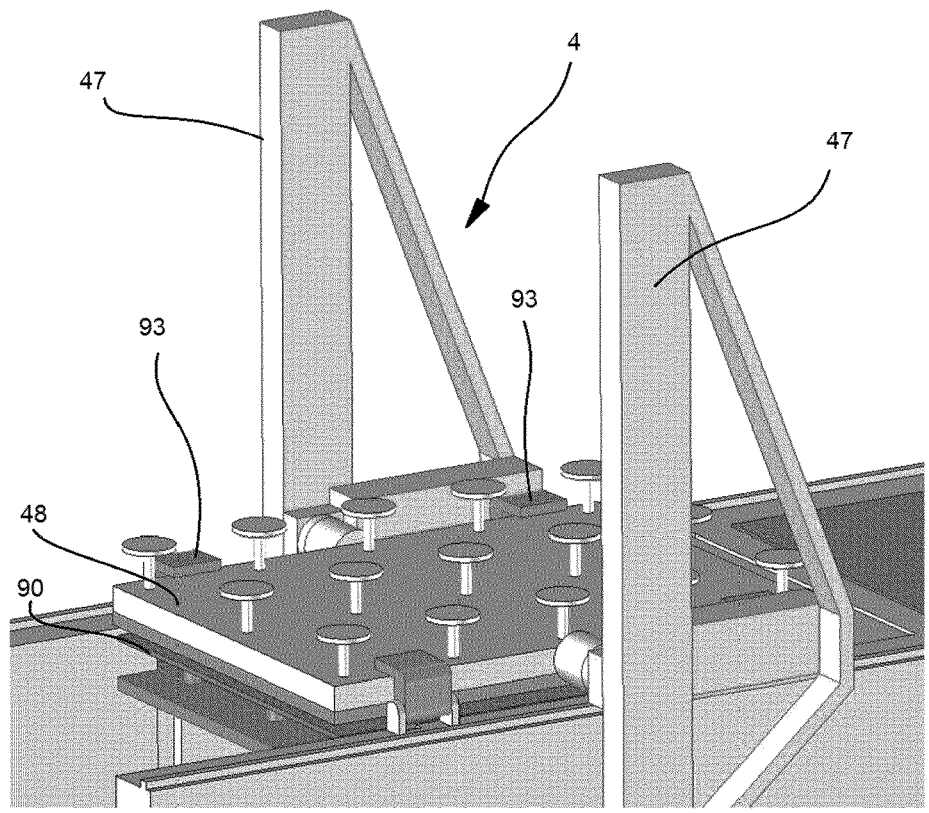

When referring now to FIG. 26, we can see that the mounting table 90, associated with its elevator as well as with the gripping plate 48 of the loading/turning station 4, can facilitate pressing operations after gluing.

Thus, the gripping plate 48 is turned upside down on the stack, not shown, of freshly glued sheets, positioned on the mounting table 90, while, on the one hand, flanges 93, which the assembling area includes, on the periphery of the mounting table 90, clamp the gripping plate 48, and on the other hand, the mounting table 90 associated with its elevator presses the stack from the bottom to the top.

Advantageously, the pressing force is received by the flanges 93, and not by the gantry of the loading/turning station 4.

Figure 27:
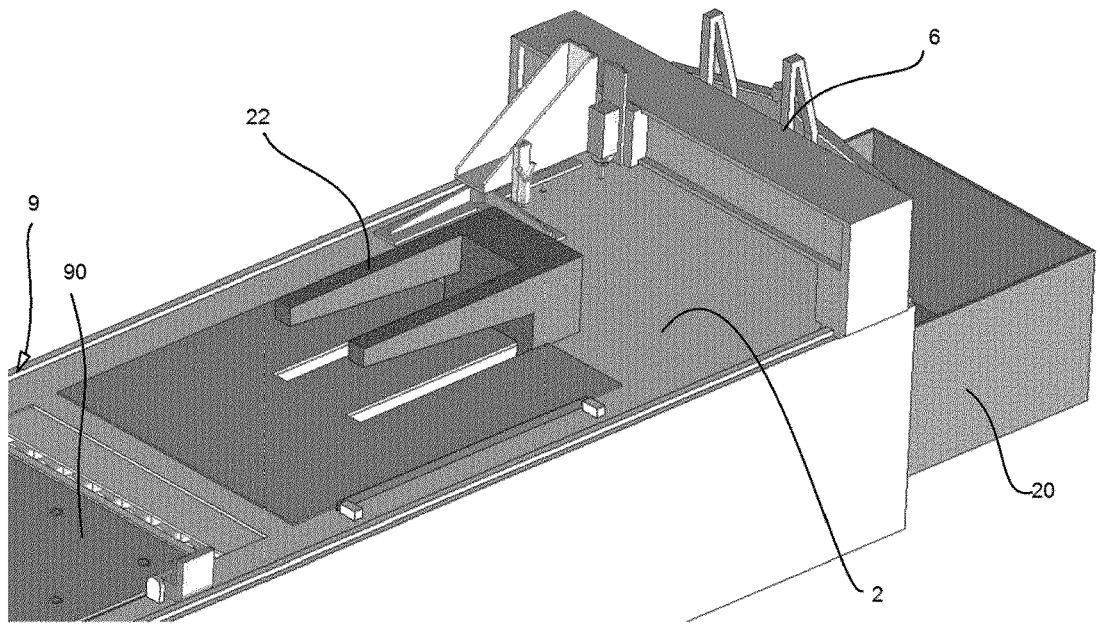
Figure 28:
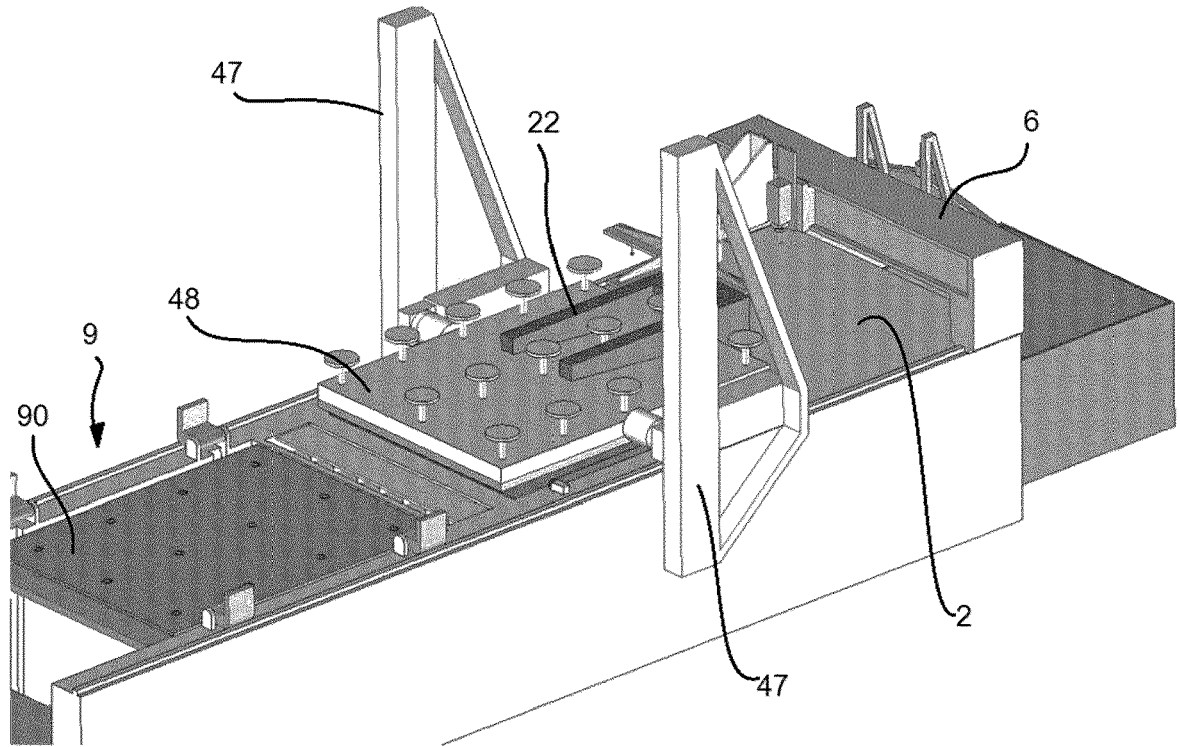

When referring now to FIGS. 27 and 28, we can see that the table 2 incorporates a fork 22, capable of being extracted therefrom in order to lift the plate M, not shown, after it has been machined on the front side, in order to permit the gripping plate 48 to pass under it in order to grip it by its non-machined back side, which facilitates its gripping, with a view to turning it upside down.

Figure 29:
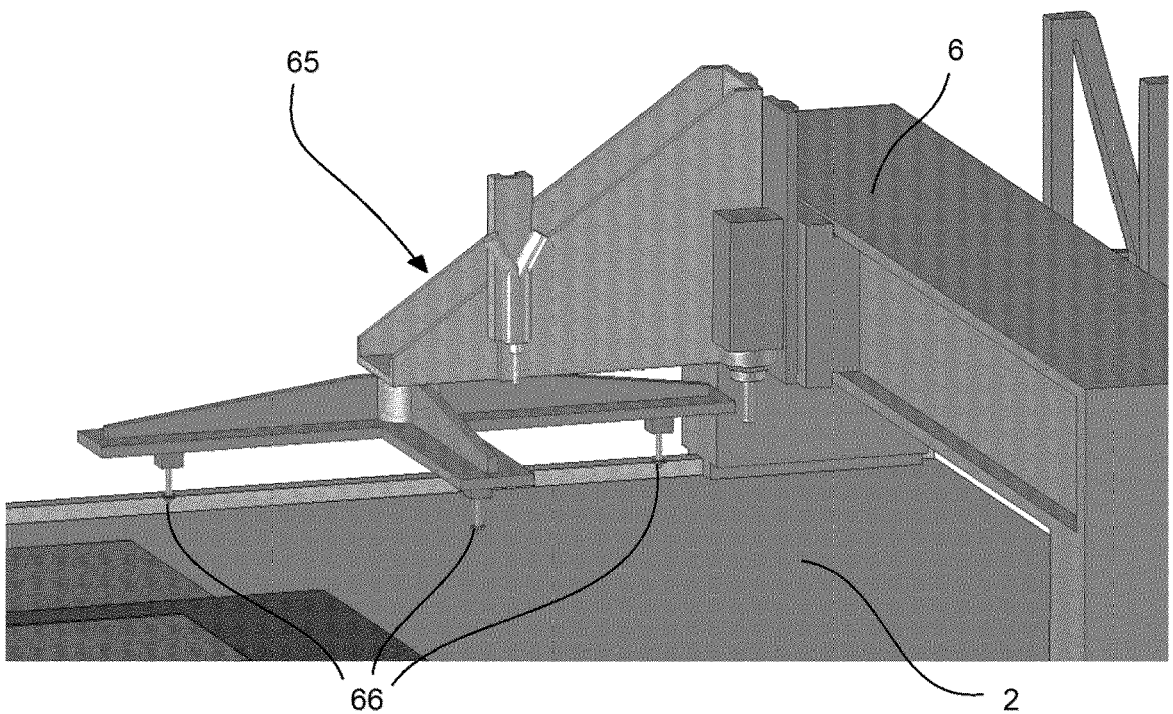

When referring to FIG. 29, we can see that the gantry 6 is equipped with a gripper 65, provided with three gripping points 66, permitting to grip the sheets in a very stable manner.

The machine shown in these figures permits to implement the method according to the invention in the same way as with the above-described machines, while being of a more compact and rigid design.

We claim:

1. A machine for automated layer-by-layer additive manufacturing of an object, the machine comprising:
   a machining table maintained by vacuum;
   a machining tool mounted movably in displacement above said machining table;
   a turning station comprising:
     a cross member, movable longitudinally above said machining table and movable vertically;
     means for gripping a plate, being carried by said cross member and being mounted movably in rotation along an axis parallel to said cross member; and
     means for supporting the plate that is cooperative with the means for gripping the plate so as to permit gripping of either a front side or a back side of the plate while the plate resides on the means for supporting the plate;
   a wedging abutment on said machining table to facilitate marking and positioning of the plate in the X and Y directions;
   two benches over said machining table, wherein said cross member is movably mounted on said two benches;
   a movable cross member movably mounted on said two benches;
   a tool holder movably mounted on said movable cross member; and
   an assembling area attached to said machining table, wherein said assembling area comprises:
     a mounting table, and
     an elevator surface within said mounting table so as to maintain height of the object on the mounting table according to height of said machining table.

2. The machine according to claim 1, wherein said turning station is further comprised of two carriages each movable on one of the two benches, respectively, and wherein the cross member is mounted between the two carriages.

3. The machine according to claim 1, wherein said tool holder is compatible with a gripper so as to hold a part cut from the plate.

4. The machine according to claim 1, wherein said machining tool is mounted on said tool holder.

5. The machine according to claim 1, further comprising: means for cleaning the machining table, said tool holder being compatible with the means for cleaning.

6. The machine according to claim 1, wherein said assembling area further comprises;
   means for clamping against mounting table so as to press the object cooperatively with said elevator surface during assembling and after gluing of the object.

7. The machine according to claim 1, wherein the means for supporting the plate is retractably mounted in said machining table.

8. A method of using the machine of claim 1 for automated layer-by-layer additive manufacture of the object, the method comprising the following steps:
   digitally decomposing the object by digital slicing of the object into different sheets along one or several axes so as to determine a set of sheets corresponding to the object;
   optimizing a distribution of each sheet of said set of sheets in the plate, which serves as raw material for forming the set of sheets;
   calculating a trajectory of said machining tool for micro-milling the plate;
   micro-milling of a front side of the plate according to said trajectory;
   turning the plate upside down and and positioning the plate against the wedging abutment using the means for gripping the plate;

micro-milling a back side of the plate according to said trajectory;

extracting a first sheet of said set of sheets from the plate and positioning said first sheet in a horizontal XY-plane on said assembling area;

depositing glue on said first sheet;

extracting a second sheet of said set of sheets from the plate and depositing said second sheet on said first sheet; and repeating the steps of depositing glue and extracting each sheet of said set of sheets until the object is assembled.

9. The method, according to claim 8, further comprising the step of:

positioning assembling elements internal or external to the object to facilitate assembly of the object, and removing the assembling elements after assembly.

10. The method, according to claim 8, further comprising the step of:

after stacking each sheet of the set of sheets, micro-milling so as to remove excess material and so as to rectify defects related to stacking each sheet of said set of sheets.

\* \* \* \* \*